Patented Feb. 20, 1923.

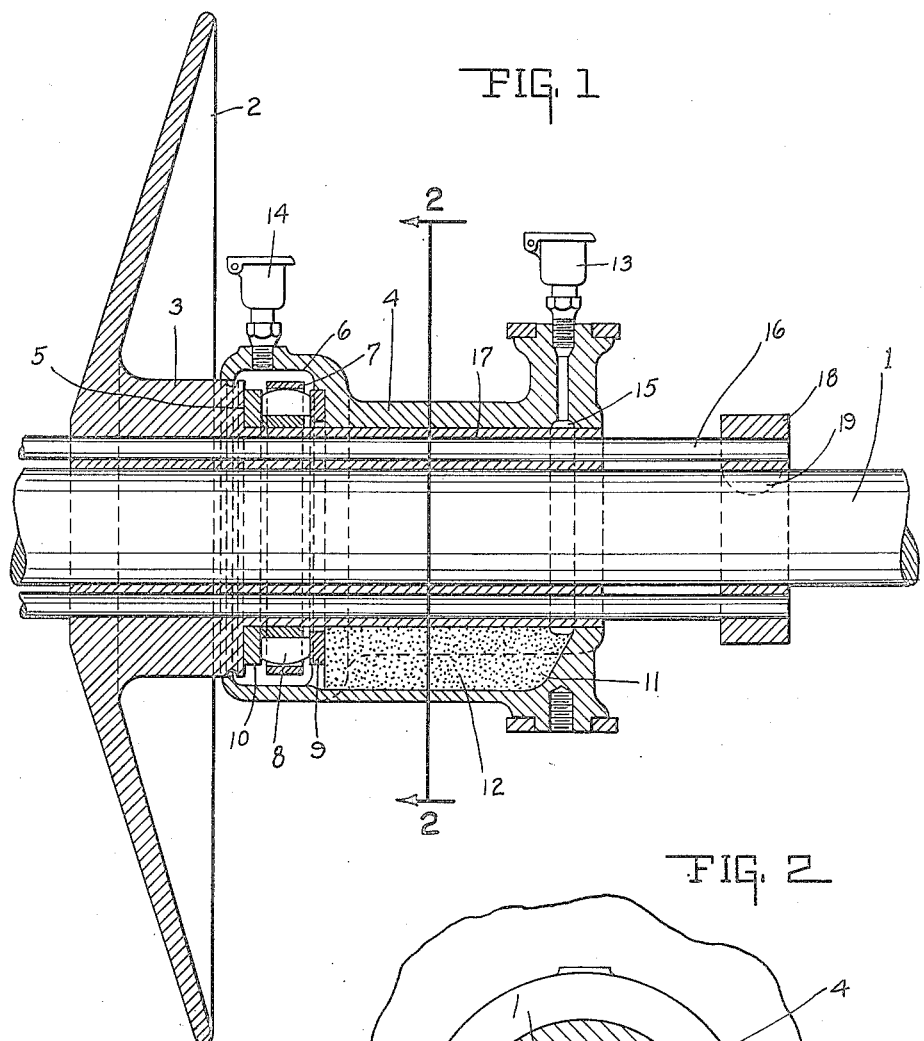
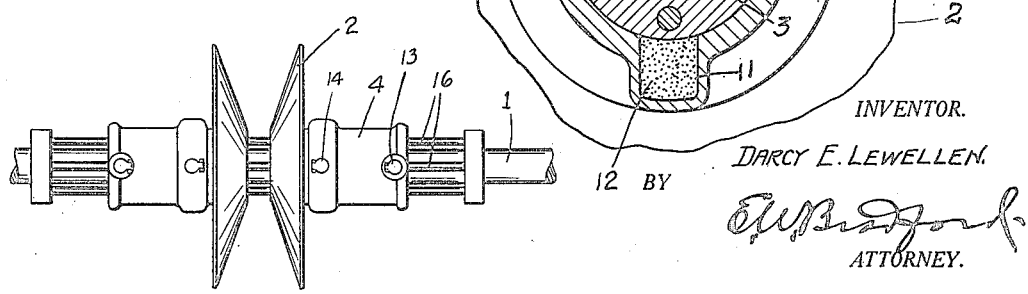

1,446,387

UNITED STATES PATENT OFFICE.

DARCY E. LEWELLEN, OF COLUMBUS, INDIANA, ASSIGNOR TO LEWELLEN MANUFACTURING COMPANY, OF COLUMBUS, INDIANA, A CORPORATION OF INDIANA.

PIN DRIVE FOR VARIABLE-SPEED MECHANISM.

Application filed October 21, 1921. Serial No. 509,357.

*To all whom it may concern:*

Be it known that I, DARCY E. LEWELLEN, a citizen of the United States, residing at Columbus, in the county of Bartholomew and State of Indiana, have invented certain new and useful Improvements in Pin Drives for Variable-Speed Mechanism, of which the following is a specification.

This invention relates to improvements in pin drive for variable speed mechanism, and the prime feature of the invention is the provision of means for causing the driving disks to rotate with the shaft and at the same time have longitudinal movement of the shaft.

A further feature of the invention is in so constructing the driving pin that the disks may have relatively long adjustments without increasing the length of the parts of the disks.

A further feature of the invention is the manner of arranging the thrust bearings around the hubs of the disks and leaving the outer ends of the hubs free so that the pins may pass longitudinally through the hubs and within the thrust bearings, and entirely removed from the path of the levers and parts employed for adjusting the disks, And a further feature of the invention is the provision of means on the driving shaft to which the outer ends of the pins are secured for holding the pins in spaced relation with the shaft and holding them substantially rigid regardless of the position of the disks thereon, the disks being preferably located between the pin supporting means.

Other objects and advantages will be hereinafter more fully set forth and pointed out in the accompanying specification.

In the accompanying drawings,

Figure 1 is a detail longitudinal sectional view through one of the driving disks and parts associated therewith, Figure 2 is a transverse sectional view as seen on line 2—2, Figure 1, and Figure 3 is a detail plan view of a pair of disks and means for driving the same.

Referring to the drawings, 1 indicates a power or driving shaft, such as is commonly used in connection with variable speed mechanism and associated with said shaft are the usual form of driving disks 2, each disk having a hub 3 through which the shaft 1 extends. In order to economize in space and at the same time provide an elongated hub for the disks, the thrust bearing yoke 4 usually employed in connection with devices of this class, is mounted around a portion of the hub 3, the outer end of the hub being reduced in diameter to form a bearing shoulder 5. The inner end of the yoke 4 is provided with a circular housing 6 in which is positioned a thrust bearing 7, the rollers 8 of the thrust bearing riding against plates 9 and 10 of relatively hard material, said plates resting against one end of the yoke 4 and the bearing shoulder 5, respectively.

As the hub 3 rotates within the yoke 4, means is provided for lubricating the interior of the yoke which in this instance comprises a cavity 11 formed at the bottom of the yoke 4, in which is placed any suitable form of packing 12 for retaining lubricant, and suitable oil cups 13 and 14 are attached to the yoke 4 for supplying lubricant, the cup 13 discharging its contents into a duct 15, while the cup 14 discharges its contents into the housing 6 and directly onto the thrust bearing. As the cups are preferably positioned above the driving shaft, lubricant will gradually feed into the cavity 11 and be absorbed by the packing therein.

It has been customary heretofore to key the disks onto the driving shaft or drive the disks by means of pins which were so arranged as to limit the longitudinal movement of the disks, thereby curtailing the adjustment of the disks, and at the same time leaving a more or less weakened construction. To overcome these objectionable features, the driving pins 16, shown in this construction, are extended through bores 17 which are formed lengthwise through the hubs 3 of the disks and within the yokes 4 and thrust bearings carried thereby, the driving pins being of such length that they will extend entirely through the hubs of both disks and a distance therebeyond so as to provide for the longitudinal movement of the disks. The ends of the driving pins 16 are attached to collars 18 which are in turn fixed to the driving shaft 1 by means of keys 19 or otherwise, thereby causing the pins and the disks through which they extend to rotate with the shaft, but permitting the disks to have free longitudinal movement on the shaft. The collars are so located that the hubs of the disks 2 are positioned on the shaft at points between the collars, consequently the pins will remain substantially rigid at whatever points in their length the disks may be positioned as the hubs will be engaged with the pins throughout the entire length of the hubs. By arranging the driving pins in this manner any slight inaccuracy in the registration of the bores of the disk hubs, and the openings in the collars into which the ends of the pins are secured, will not affect the longitudinal movement of the disks, nor the driving action of the pins on the disks, and by anchoring the ends of the pins, they will be greatly reinforced and will readily resist any strain directed thereagainst by the disks.

In the drawings four of the pins are shown in operation, but it will be understood that a greater or less number of pins may be used, depending upon the strain to which the disks are subjected in driving different classes of machinery or the like.

Having thus fully described my said invention, what I claim as new and desire to secure by Letters Patent, is:

1. The combination with the disks of a variable speed mechanism, a driving shaft on which said disks are mounted and thrust bearings co-operating with said disks, of driving means extending through the hub portions of said disks and spaced a distance from said shaft, said driving means being within said thrust bearings, and means for anchoring the outer ends of said driving means to said shaft, said disks having free longitudinal movement on the driving means and shaft.

2. The combination with variable speed disks, thrust bearings surrounding parts of said disks, and a supporting shaft for said disks, of driving pins within said thrust bearings upon which said disks are slidably mounted, and means for anchoring the outer ends of said driving pins to said shaft for causing the pins to rotate with the shaft and drive said disks.

3. The combination with variable speed disks, thrust bearings surrounding parts of said disks, and a shaft upon which said disks are slidably mounted, of driving pins extending transversely through said disks and within said thrust bearings, a collar at each end of the driving pins to which the pins are secured, and means for causing said collars and pins to rotate with said shaft.

4. The combination with variable speed disks and a shaft upon which said disks are mounted, of elongated driving pins having sliding engagement with said disks, and means for securing the driving pins to said shaft at points beyond the ends of the hubs of the disks.

5. The combination with variable speed disks and a driving shaft, of driving pins extending longitudinally through the hubs of said disks, and of a length to permit of longitudinal movement of the disks thereon, collars to which the ends of said pins are secured, and means for anchoring the collars to said shaft for causing the pins to rotate with the shaft and drive said disks.

6. The combination with variable speed disks, a driving shaft, and thrust bearings surrounding the peripheries of the hubs of said disks, of driving pins extending lengthwise of said shaft through the hubs of said disks and within said thrust bearings.

7. The combination with variable speed disks, a driving shaft, and thrust bearings surrounding the peripheries of the hubs of said disks, of driving pins extending lengthwise of said shaft through the hubs of said disks and within said thrust bearings, and collars surrounding said shaft and attached to the ends of said pins, said disks being located on the shaft between said collars.

8. The combination with the disks of a variable speed mechanism, a driving shaft on which said disks are mounted, and thrust bearings surrounding the hub portions of said disks, of driving pins for causing said disks to rotate with said shaft, said pins being within said thrust bearings.

In witness whereof, I have hereunto set my hand and seal at Indianapolis, Indiana, this 18th day of October, A. D. nineteen hundred and twenty-one.

DARCY E. LEWELLEN. [L. S.]

Witnesses:
CAREY S. FRYE,
M. L. SHULER.